April 23, 1963 P. K. YORK 3,086,395
FLOWMETER
Filed March 4, 1960
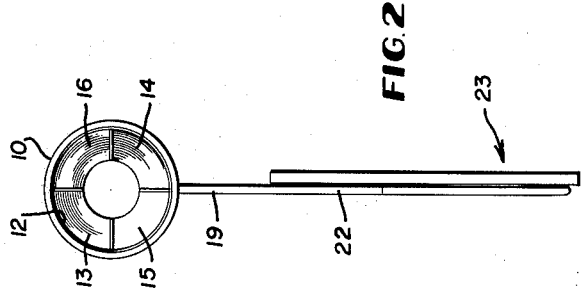
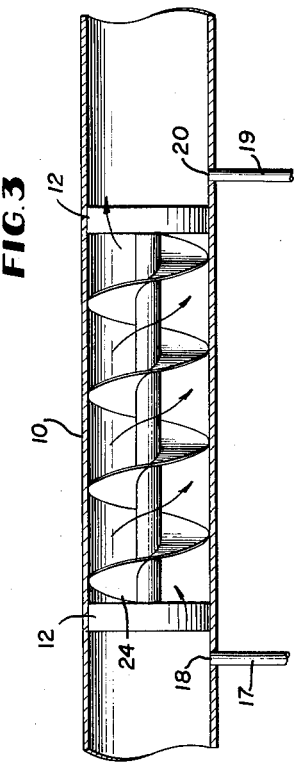
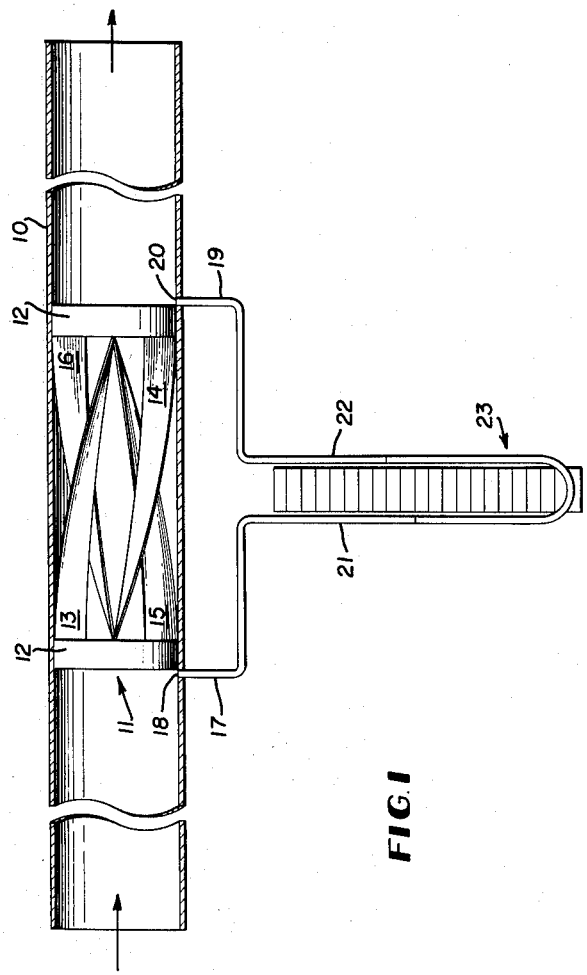
INVENTOR.
PHILIP K. YORK
BY
ATTORNEY

United States Patent Office 3,086,395
Patented Apr. 23, 1963

3,086,395
FLOWMETER
Philip K. York, 2007½ Ridgecrest Drive S.E., Albuquerque, N. Mex.
Filed Mar. 4, 1960, Ser. No. 12,827
3 Claims. (Cl. 73—205)

The present invention relates to flowmeters, and relates more particularly to an improved flowmeter for measuring the rate of flow of fluids, such as gases or liquids, more accurately and more dependably.

More specifically, the instant invention is directed to a flowmeter of improved construction which is adapted to be inserted in a fluid conduit for restricting the flow of liquid whereby a pressure differential is developed, thus affording a measure of the volume rate of fluid flow through the conduit. As is well known, a drop in pressure across a flow restrictor is a measure of the rate of flow of fluid, the drop in pressure varying with the rate of flow according to well-established laws.

Heretofore flowmeters employing Venturi tube arrangements have been employed to create a pressure differential for the purpose of measuring the rate of flow of a fluid passing through a pipe or conduit. This type of flowmeter suffered from the disadvantage that they were necessarily of relatively great length, particularly on the upstream side. This is due to the fact that the required gradation in diameter between the ends and the throat had to take place gradually in order to insure a smooth flow pattern. Accordingly, the Venturi tubes were not only of great length but were also expensive in cost. Moreover, the length and construction of the Venturi tube made for difficulty of installation in the pipe or conduit.

Another form of flowmeter heretofore commonly employed was that of the orifice type wherein a plate having an opening or orifice therein was used to create a pressure drop. In this type of flowmeter corrosion products and other extraneous matter collected on both sides of the orifice plate, which accumulations eventually caused inaccuracies in readings to develop.

An important object of this invention is to provide an improved flowmeter which will be free from the foregoing and other disadvantages, and which will be exceptionally easy to install in a conduit, inexpensive in cost, and accurate in use.

In its broadest aspect, the flowmeter of this invention contemplates the use of a fluid flow restrictor in the form of helical baffles to create a pressure drop in fluid flowing through a conduit. The helical baffles are attached to the conduit wall and are adapted to increase the velocity of the fluid near the conduit wall by imparting a twisting motion to the fluid with a consequent decrease in pressure. For a given fluid, the size and angle of twist of the helical baffles are dependent on the fluid density and viscosity, as well as range of flow rate.

Another object of this invention is the provision of a flowmeter in which the pressure difference creating element is in the form of a cartridge containing helical baffles, which cartridge is readily insertable directly into the desired position in the conduit.

Still another object of this invention is to provide a pressure difference creating element wherein the helical baffles comprise a plurality of spaced vanes having the desired degree of twist.

A further object of this invention is to provide a pressure difference creating element wherein the helical baffles are in the form of a continuous helix.

Other objects and advantages of this invention, together with certain details of construction and combinations of parts, will appear from the following detailed description and will be pointed out in the appended claims.

In the drawings wherein preferred embodiments of this invention are shown,

FIGURE 1 is a diagrammatic view, in cross-section, of a flowmeter wherein the pressure difference creating element is in the form of a plurality of spaced twisted vanes, FIGURE 2 is an end elevational view of the device shown in FIGURE 1, and FIGURE 3 is a diagrammatic view, in cross-section, of another embodiment of the instant invention.

Like reference numerals indicate like parts throughout the several views of the drawing.

Referring now to the drawing for a detailed description of this invention, and particularly to FIGURES 1 and 2 wherein the preferred embodiment is shown, reference numeral 10 designates a pipe or conduit forming part of a fluid system. Conduit 10 may be of any conventional construction and may be formed of tubing or pipe sections or the like arranged in fluid-tight sealing relationship, through which the fluid is to be passed. The conduit 10 may be formed of any suitable material of appropriate physical and chemical properties depending upon the nature and character of the fluid being metered.

A flow restrictor element indicated generally by reference numeral 11 is disposed within the conduit 10 in such a manner that it is prevented from movement once it is installed. Thus, it may be force-fitted or it may be fused to the wall of the conduit. The flow restrictor element is preferably fabricated in cartridge form by mounting within two annular flanged caps 12 a plurality of flat ribbon-like vanes 13, 14, 15 and 16, in criss-cross arrangement. These vanes are provided with a helical twist, the degree of the twist depending upon the characteristics of the fluid bearing metered, i.e. the density and viscosity thereof and the range of the flow rate. Normally, the degree of twist is about ninety degrees.

A pipe 17 is suitably connected to a suitable opening 18 in conduit 10 on the upstream side of the flow resistor element and a pipe 19 is connected to a similar opening 20 on the downstream side. The pipes 17 and 19 lead to and are joined to arms 21 and 22, respectively, of a manometer 23 of conventional construction. As is well known the difference in the height of the liquid in the two arms 21 and 22 of the manometer is the measure of the difference in pressure on the two sides of the flow constrictor, from which the rate of flow is calibrated. It is to be understood that in place of the manometer 23 any conventional form of pressure measuring device may be employed.

In FIGURE 1 the arrows indicate the direction of flow of the fluid being passed through the conduit. As the fluid enters the flow restrictor the helical baffles 13, 14, 15 and 16 impart a twisting motion to the fluid in the vicinity of the conduit wall thus increasing the velocity of the fluid. This increased velocity effects a drop in pressure which is indicated on manometer 23.

In FIGURE 3 there is shown a modification wherein the baffles are in the form of a continuous helix 24 mounted on a shaft 25. Like the helical baffles shown in the flow restrictor of FIGURE 1, the helix 24 is preferably mounted in caps to form a cartridge for convenient insertion and retention in the conduit 10.

The present invention may be embodied in other specific forms without departing from the spirit of the invention.

What is hereby claimed to be new and desired to be secured by Letters Patent is:

1. A flowmeter for use in combination with a conduit conveying fluid, said flowmeter including a baffle arrangement comprising a plurality of flat ribbon-like vanes each having a helical twist therein along the longitudinal axis thereof, annular caps at both ends of said baffle arrangement for mounting said vanes whereby the vanes are spaced from each other between said caps, said vanes substantially filling and thereby narrowing the fluid passageway in said conduit.

2. A flowmeter in accordance with claim 1, wherein said flat ribbon-like vanes are mounted between said annular caps in criss-cross arrangement.

3. A flowmeter in accordance with claim 1 further including pressure sensing means to measure the pressure drop in the fluid.

References Cited in the file of this patent

UNITED STATES PATENTS

| | | |
|---|---|---|
| 638,625 | Chesley | Dec. 5, 1899 |
| 1,061,474 | Hartel | May 13, 1913 |
| 1,181,490 | Levin | May 2, 1916 |
| 1,487,989 | Vose | Mar. 25, 1924 |
| 1,665,141 | Mayer | Apr. 3, 1928 |
| 1,759,239 | Morrison | May 20, 1930 |
| 2,057,767 | Collins | Oct. 20, 1936 |
| 2,212,186 | Ricardo et al. | Aug. 20, 1940 |
| 2,800,794 | Meneghelli | July 30, 1957 |
| 2,811,855 | Kotas | Nov. 5, 1957 |
| 2,862,522 | Yost | Dec. 2, 1958 |

FOREIGN PATENTS

| | | |
|---|---|---|
| 704,894 | France | May 28, 1931 |
| 435,176 | Great Britain | June 11, 1934 |

OTHER REFERENCES

Principles of Aeronautics by James Dwinnell, published 1949 by McGraw-Hill, pages 24 and 25; copy available in Div. 36.

Handbook of Engineering Fundamentals by Eshback, published 1936 by Wiley, pages 4–41; copy available in Div. 36.